(12) United States Patent
Schatz

(10) Patent No.: US 9,652,087 B2
(45) Date of Patent: May 16, 2017

(54) TELECOMMUNICATION UNIT HAVING A PROJECTION DEVICE AND METHOD FOR OPERATING A TELECOMMUNICATION UNIT HAVING A PROJECTION DEVICE

(71) Applicant: Robert Bosch GmbH, Stuttgart (DE)

(72) Inventor: Frank Schatz, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/396,329

(22) PCT Filed: Feb. 25, 2013

(86) PCT No.: PCT/EP2013/053687
§ 371 (c)(1),
(2) Date: Oct. 22, 2014

(87) PCT Pub. No.: WO2013/159949
PCT Pub. Date: Oct. 31, 2013

(65) Prior Publication Data
US 2015/0084931 A1   Mar. 26, 2015

(30) Foreign Application Priority Data

Apr. 25, 2012  (DE) .................. 10 2012 206 850

(51) Int. Cl.
*G06F 3/042*   (2006.01)
*G06F 3/0488*   (2013.01)
(Continued)

(52) U.S. Cl.
CPC .......... *G06F 3/0425* (2013.01); *G06F 1/1686* (2013.01); *G06F 3/044* (2013.01); *G06F 3/0488* (2013.01)

(58) Field of Classification Search
CPC ...... G06F 3/0304; G06F 3/0425; G06F 3/017; G06F 3/03545; G06F 3/0386;
(Continued)

(56) References Cited

U.S. PATENT DOCUMENTS

| 2010/0085316 A1 | 4/2010 | Kim |
| 2011/0130159 A1* | 6/2011 | Chen ..................... G06F 3/0317 455/466 |

(Continued)

OTHER PUBLICATIONS

International Search Report, PCT International Application No. PCT/EP2013/053687, dated Jul. 11, 2013.

*Primary Examiner* — Gerald Johnson
(74) *Attorney, Agent, or Firm* — Gerard Messina

(57) ABSTRACT

A telecommunication unit is provided, having a projection device for projecting image information onto a projection area located outside the telecommunication unit, the telecommunication unit being configured so that the projection device projects the image information in various first directions of a projection direction range onto the projection area, starting from the telecommunication unit. The telecommunication unit has an input detection device next to the projection device; the telecommunication unit being further configured so that, using the input detection device, a user input undertaken using a movement of a body part of a user is detectable; the user input taking place, starting from the telecommunication unit, in a detection direction range located outside the projection direction range; the user input being contactless with respect to the telecommunication unit.

6 Claims, 1 Drawing Sheet

(51) Int. Cl.
*G06F 1/16* (2006.01)
*G06F 3/044* (2006.01)

(58) Field of Classification Search
CPC ........ G06F 3/012; G06F 3/0346; G06F 3/038;
G06F 3/0484; G06F 3/0488
See application file for complete search history.

(56) References Cited

U.S. PATENT DOCUMENTS

| | | | |
|---|---|---|---|
| 2011/0181553 A1* | 7/2011 | Brown ................... | G06F 3/0425 345/175 |
| 2012/0062453 A1* | 3/2012 | Oks ......................... | G06F 3/017 345/156 |

* cited by examiner

TELECOMMUNICATION UNIT HAVING A PROJECTION DEVICE AND METHOD FOR OPERATING A TELECOMMUNICATION UNIT HAVING A PROJECTION DEVICE

FIELD

The present invention relates to a telecommunication unit having a projection device for projecting image data onto a projection surface that is located outside the telecommunication unit.

BACKGROUND INFORMATION

Such telecommunication units are available, particularly in the form of telecommunication terminal units, such as portable computers or portable telephones or the like, which have a projection device.

Such communication units have the advantage that, for showing image information, not only a comparatively small display area, or rather display device of the telecommunication unit is available but, especially in the case in which several people have to look together at the image information shown, the functionality is made possible that the image information is projected onto a projection area that is located outside the telecommunication unit. In such a showing of an image or a film using a projection device, also designated as a beamer below, the control in stationary units is usually provided using remote operation and a corresponding menu control, the menu being typically displayed directly in the projected image. However, even in the case of the integration of a projection device into a typically portable telecommunication unit, the functionality is required that control elements and control data have to be transferred or transmitted to the unit.

In a projection device built into a portable telecommunication unit, this usually takes place in that the unit, particularly a touch-sensitive surface of the unit, or an input device such as a keyboard device, or the like, has to be touched (particularly by a finger of the user), which has the disadvantage, however, that a projected image is interfered with, in particular by wobbling or other negative effects. In addition, it is a disadvantage that on a telecommunication unit, especially a portable one, there is typically little space for input elements, such as control buttons or operating devices, and that the unit is frequently not positioned optimally, for the operation of the input elements by a user, when the projection device is used.

SUMMARY

An example telecommunication unit in accordance with the present invention and an example method in accordance with the present invention for operating a telecommunication unit may have the advantage that showing the image information projected onto the projection area located outside the telecommunication unit is not impaired by the fact that, for the operation of the telecommunication unit and for the operation of the projection of the image information onto the projection area (for instance the change of loudness of a reproduction or the switch-over of static image information to a further image, etc.) the telecommunication unit has to be touched, so that not even any interference of the projected image information is caused by the touching.

According to a preferred specific embodiment, it is provided that the input detection device has a camera construction. Because of the camera device, it is advantageously possible, according to the present invention, that a user input, undertaken, for example, by the motion of a body part of a user, is detected by the input detection device because the user input is able to take place in the detection direction range of the telecommunication unit and within a maximum detection distance (as well as, as a rule, also outside a minimum detection distance) of the camera device. Because of this, it is advantageously possible, according to the present invention, that a kind of pointing device (of the type of a computer mouse) be provided for such projection devices located in telecommunication units, such as pico projectors (mini beamers). The user input, particularly in the form of a motion of a body part, particularly of a finger of a user, which takes place within a distance range in front of the camera device (i.e., within the detection direction range), may then be used to control the telecommunication unit and particularly the projection device. Alternatively to a user input in the form of a movement of a body part of a user, it may also be provided, according to the present invention, that the user input, in the form of a motion (triggered by the movement of a body part of the user) of a pointing element, such as, for instance, a wand be provided.

In particular, it is preferred, according to the present invention, that the telecommunication unit is configured in such a way that, to operate the input of the detection direction, a pointing information is shown as a function of the user input. Thereby it is advantageously possible, according to the present invention, that the user receives a feedback on the user input. It is also possible and preferred, however, according to the present invention, that no pointing information is shown and fed back to the user as feedback for the user input that was undertaken, but that the control of the telecommunication unit is performed using gestures, i.e., that the movement of a body part of a user takes place in the form of a gesture, perhaps the spreading of two fingers so as to enlarge an image section.

It is further preferably provided that the pointing information is a part of the image information projected onto the projection area. Thereby it is advantageously possible, according to the present invention, that it is the projection of the image information, and that therefore the feedback takes place via the user input. This has considerable advantages compared to a feedback, because the pointing information is shown at a different place than by the projection of the image information, for instance, via a display device and a display area of the telecommunication unit. This is because, in telecommunication units, there is typically a tendency to miniaturization, and consequently also outside dimensions and thus the size of a possible display area are reduced. Furthermore, showing the pointing information as a part of the projected image information has the advantage that a display surface, located on the telecommunication unit during the projection of the image information onto the projection area located outside the telecommunication unit, does not have to be understandable, that is, the user is able to operate and change the telecommunication unit and particularly the projection of the image information onto the projection area, although the telecommunication unit is situated in such a way that the display surface of the telecommunication unit is not well understandable for the user, or rather, the eyes of the user are located at such a distance from the display surface of the telecommunication unit that a good view and good recognition of the information content shown on the display surface is not possible, or only with difficulty. Moreover, the display surface of the telecommunication unit may be switched off during the projection operation for reasons of energy saving.

It is also preferably provided, according to the present invention, that the input detection device is an input surface having a capacitive sensor system. Because of that, it is possible, according to the present invention, also to implement a contactless control of the telecommunication unit without a camera device.

It is further preferred, according to the present invention, if the input detection device cooperates with a display device having a display surface, the pointing information being shown on the display surface; and the display surface coinciding at least partially with the input area. Thereby, alternatively or cumulatively, for showing the pointing information on the projected image information, an additional feedback possibility to the user, of the user input that was undertaken, is possible.

In accordance with the present invention, it is particularly preferred if the telecommunication unit is a telecommunication terminal unit, especially a portable telecommunication terminal unit, in the form of perhaps a portable computer or a portable mobile telephone or a so-called PDA device (personal digital assistant). Thereby it is possible, according to the present invention, in an advantageous manner, to use the projection device of such a device at a time when a bigger display surface is desired, especially when several people are simultaneously supposed to see the image information.

A further subject matter of the present invention is an example method for operating a telecommunication unit having a projection device.

Exemplary embodiments of the present invention are illustrated in the figures and explained in greater detail below.

DETAILED DESCRIPTION OF EXAMPLE EMBODIMENTS

In the various figures, identical parts are provided with the same reference symbols and therefore are generally labeled or mentioned only once.

Figure 1:
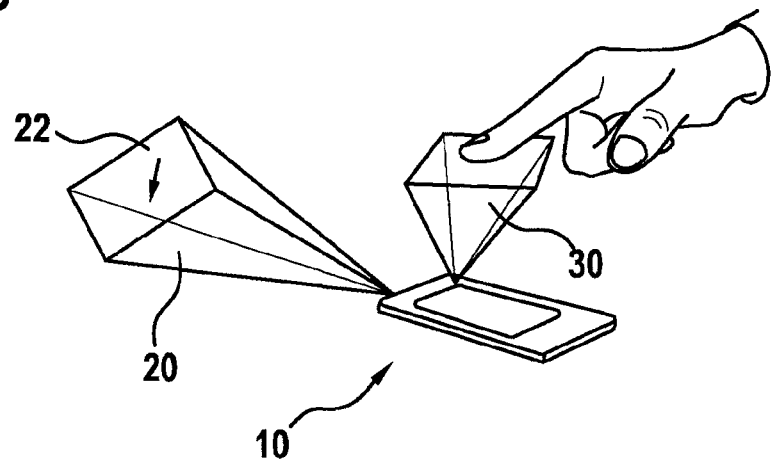
FIG. 1 shows a schematic perspective illustration of an example telecommunication unit according to the present invention, having a projection device.

FIG. 1 shows a schematic, perspective illustration of a telecommunication unit 10, which is in a position to project image information to a projection area located outside the telecommunication unit. In this instance, the image information is projected in various first directions of a projection direction range 20, starting from the telecommunication unit. A user input, undertaken by using a movement of a body part of a user, particularly the finger of a user, is detected by an input detection device 12, it being provided, according to the present invention, that the user input, takes place, starting from telecommunication unit 10, in a detection direction range 30 that is located outside the projection direction range 20. In this case, the user input takes place, according to the present invention, in a contactless manner with respect to telecommunication unit 10. This means that the user input, that is, the movement of a body part of a user, is undertaken in such a way that the body part of the user is at least at a minimum distance from telecommunication unit 10 and that the distance of the body part undertaking the user input (starting from telecommunication unit 10) does not take place in the direction of projection direction range 20. For the implementation of a feedback on the input movement or on the user input, particularly for implementing a locality information of the place of the body part undertaking the user input, it is preferably provided, according to the present invention, that a pointing information 22 is displayed as a part of the projected image information in projection direction range 20.

Figure 2:
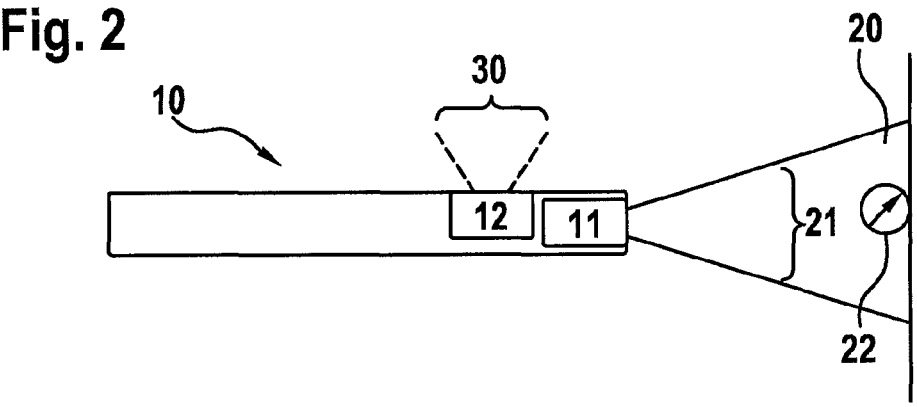
FIG. 2 shows a schematic side view of the example telecommunication unit according to the present invention.
Figure 3:
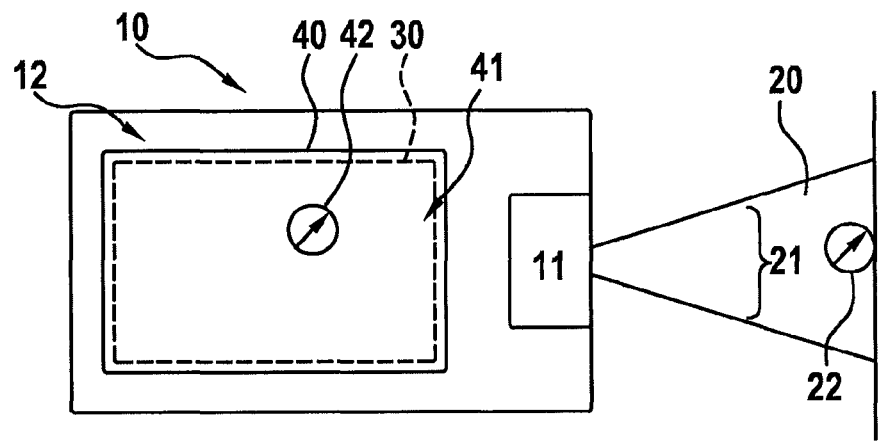
FIG. 3 shows a schematic top view of the example telecommunication unit according to the present invention.

FIG. 2 shows in a schematic manner a side view of a telecommunication unit 10, according to the present invention. FIG. 3 shows in a schematic manner a top view onto a telecommunication unit 10, according to the present invention. One may infer from both FIG. 2 and FIG. 3 that telecommunication unit 10 has a projection device 11, especially in the form of a so-called beamer functionality, or in the form of a miniaturized projector, which is also designated as a pico projector. Using projection device 11, image information 21 is projected onto a projection surface located outside telecommunication unit 10, the projection range or projection direction range 20 either being specified by projection device 11 or being at least specified for a given projection situation on the part of the user (for instance, by setting projection device 11 relative to the remaining telecommunication unit 10). Within a detection direction range 30, the user input is detected in a contactless manner by input detection device 12. In FIG. 2, in this instance, the example of an input detection device 12, in the form of a camera device, is indicated schematically, detection direction range 30 being indicated schematically using a dashed line as a registration field of input detection device 12 provided as a camera device. Detection direction range 30 is different from projection direction range 20, according to the present invention, and in particular, these are disjoint. For example, projection device 11 is provided on telecommunication unit 10 in such a way that, for instance, an emission of image information 21 from the front side of telecommunication unit 10 is provided, while the detection direction range is defined by the placing of the camera device as input detection device 12 on the upper side of telecommunication unit 10 (when the registration range of the camera device of input detection device 12 corresponds to the range of the upper side) (is defined on the lower side of telecommunication unit 10 or when the registration range of the camera device is situated before the lower side; telecommunication unit 10 then has to make contact lying on its front side). FIG. 3 shows a specific embodiment of telecommunication unit 10, in which input detection device 12 is implemented in the form of an input surface, especially having a capacitive sensor system, so that not only a touching user input is able to be detected by input detection device 12, but also a user input made in a contactless manner. Accordingly, detection direction range 30, according to the specific embodiment as in FIG. 3, preferably extends over the entire area of input detection device 12 in the form of an input area. It may be provided, according to the present invention, that the input area or input detection device 12 cooperates with a display device having a display surface 40 (perhaps in the form of a touch-sensitive or approach-sensitive display device), so that a pointing information 42 is able to be shown over the locality of the input movement or the user input. However, it is preferably provided, according to the present invention, that pointing information 22 is shown as a part of the image information of the image projected onto the projection area or projected image information 21. Both pointing information 22 as part of projected image information 21 and pointing information 42 as part of the information shown on display surface 40 may also be provided combined with each other, according to the present invention, so that a user has a plurality of possibilities for feeding back the locality information of the user input.

According to the present invention, it is advantageously possible to utilize input detection device 12 located in telecommunication unit 10 as a replacement of a pointing unit (especially as a substitution for a mouse). When projection device 11 is used, telecommunication unit 10 typically lies on its back side or its front side. On the front side or upper side of telecommunication unit 10 or on the back side, a camera device is frequently integrated, which is used, according to the present invention, as input detection device, and has its detection direction range 30 facing upwards. In this registration range (detection direction range 30) of the camera device, a user, particularly using finger movements, is able to carry out control gestures, the finger, or another body part of the user, being able to be recognized by the camera device via an appropriate data processing software, and in particular, the position of the body part of the user (especially the finger position) in projected image information 21 (or as its part) being shown, for example, as a so-called cursor arrow. With that, a pointing functionality (analogous to a computer mouse) is implemented, without touching the telecommunication unit, and furthermore, without having to see display surface 40 of telecommunication unit 10. Pressing an image area shown in projected image information 21 (perhaps in the form of a key, perhaps as a "soft button") may be accomplished, for instance, by staying in the same position or by moving the body part in the direction of input detection device 12 of telecommunication unit 10, whereby the body part, particularly the finger, takes up a greater solid angle region, thereby making detectable the movement of the body part towards input detection device 12. According to the present invention, gestures are also possible as user inputs which are able to be used for turning over pages, for example. In this case, for instance, by a movement from left to right through detection direction range 30, turning pages over towards the front (for instance, in a document) is implemented, and by moving from right to left, turning pages back is implemented.

What is claimed is:

1. A telecommunication unit including a projection device to project an image information onto a projection area located outside the telecommunication unit, the telecommunication unit being configured in such a way that the projection device projects the image information, starting from the telecommunication unit into a projection direction range onto the projection area, the telecommunication unit having an input detection device next to the projection device and being further configured in such a way that, using the input detection device, a user input, undertaken using a movement of a body part of a user is detectable, the telecommunication unit being provided so that the user input takes place, starting from the telecommunication unit in a detection direction range that is located outside the projection direction range, the user input being made in a contactless manner with respect to the telecommunication unit, wherein the telecommunication unit is configured so that, for operating the input detection device, a pointing information is shown as a function of the user input, and wherein the pointing information is a part of the image information projected onto the projection area.

2. The telecommunication unit as recited in claim 1, wherein the input detection device has a camera device.

3. The telecommunication unit as recited in claim 1, wherein the input detection device is an input surface having a capacitive sensor system.

4. The telecommunication unit as recited in claim 1, wherein the input detection device cooperates with a display device having a display surface, the pointing information being shown on the display surface, and the display surface coinciding at least partially with an input surface of the input detection device.

5. The telecommunication unit as recited in claim 1, wherein the telecommunication unit is a portable telecommunication terminal unit in the form of one of a portable computer or a portable mobile telephone.

6. A method for operating a telecommunication terminal unit, having a projection device for projecting an image information onto a projection area located outside the telecommunication unit, using the projection device, the image information being projected, starting from the telecommunication unit into a projection direction range onto the projection area, the method comprising:
  detecting, using an input detection device of the telecommunication device next to the projection device, a user input, the detecting including detecting a movement of a body part of a user, the telecommunication unit in a detection direction range that is located outside the projection direction range, the user input being made in a contactless manner with respect to the telecommunication unit, wherein the telecommunication unit is configured so that, for operating the input detection device, a pointing information is shown as a function of the user input, and wherein the telecommunication unit is configured so that, for operating the input detection device, a pointing information is shown as a function of the user input.

* * * * *